Aug. 23, 1966 J. E. UDVARDI 3,267,759
PULLEY APPARATUS
Filed Feb. 25, 1964
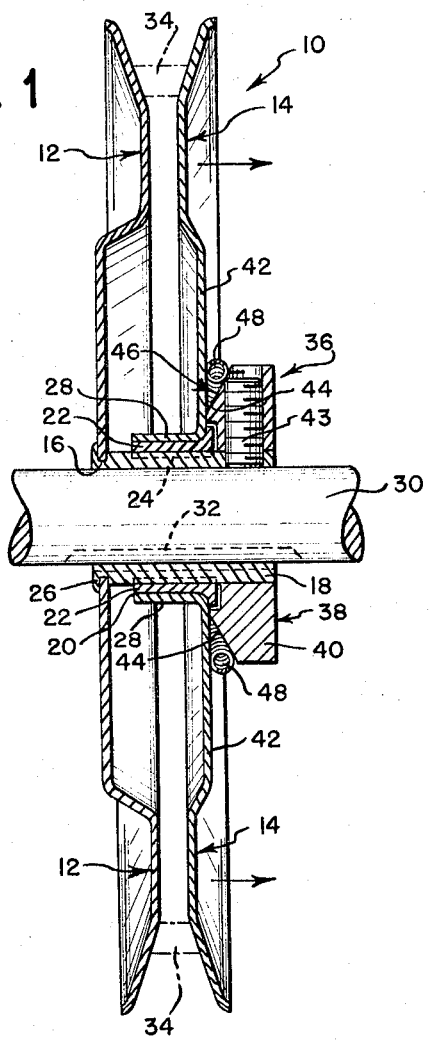
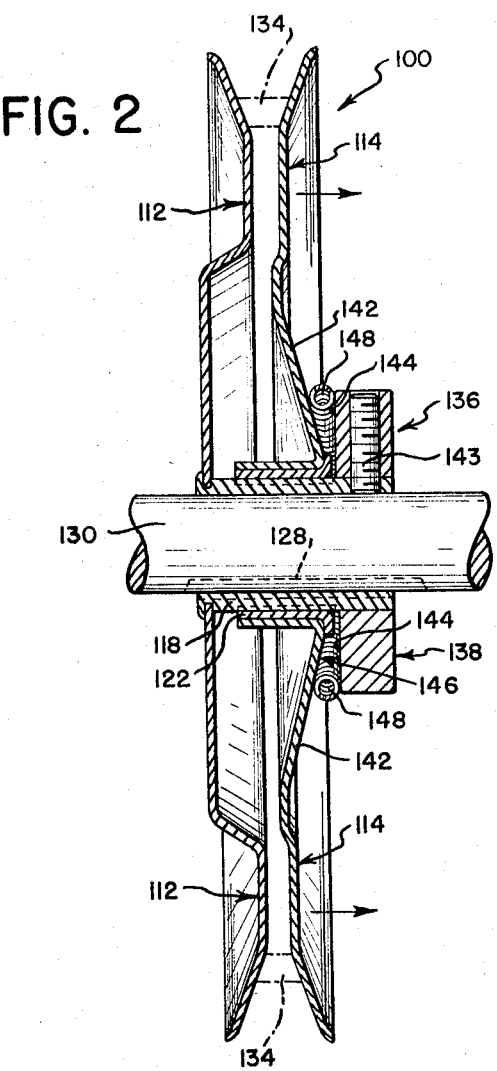
INVENTOR
JOSEPH EDWARD UDVARDI
BY
Teopro Stover & Sadler
ATTORNEYS United States Patent Office 3,267,759
Patented August 23, 1966

1

3,267,759
PULLEY APPARATUS
Joseph E. Udvardi, Cleveland, Ohio, assignor to Eaton Yale & Towne Inc., a corporation of Ohio
Filed Feb. 25, 1964, Ser. No. 347,244
6 Claims. (Cl. 74—230.17)

The present invention relates, generally, to torque transmitting devices of the pulley type.

More specifically, this invention relates to self-compensating torque transmitting pulley apparatus that is so constituted and arranged as to releasably, substantially permanently automatically adjust for slippage occurring between the sheave halves thereof and the driving means engageable therewith, such slippage being due to increased loads imposed upon the said apparatus during its operation.

Heretofore, numerous types of self-compensating pulley apparatus have been suggested which utilize the basic principle of providing control means cooperable with the pulley. The control means, upon response to slippage or drag occurring at increased loads on the pulley, is utilized to reduce the distance between the sheave halves in an effort to increase the working or effective pitch diameter of the pulley. Accordingly, the function of the control means is to relieve the slack in the belt or similar driving means passing between the sheave halves. This application of a self-compensating pulley is particularly desirable in situations where it is necessary to take up slack or slippage in belt-type driving means extending between the sheave halves.

However, such types of self-compensating pulley apparatus as have heretofore been suggested are so constituted and arranged as to be particularly inefficient in performing the function of automatically compensating for the slack or slippage in belt-type driving means. This is particularly true when the use of a flexible belt as a driving means is extensive, since variations in the loading applied thereto are continuous, and there occurs stretching or similar permanent deformation of the belt. Due to the inefficiency of such self-compensating pulley apparatus, the overall length of the belt is increased to reduce tension therein and, accordingly, slippage between the sheave halves is suffered, thereby reducing the load-carrying capabilities of the pulley.

Moreover, little, if any, provision is made for maintaining the sheave halves of the pulley apparatus in the compensated position, even should there be found some semblance of efficiency in the performance of the function of such types of self-compensating apparatus. Thus, such inefficiency is compounded in that heretofore suggested types of self-compensating pulley apparatus are substantially, if not completely, incapable of maintaining proper tension in the driving means, especially during each and every one of the sequences of operation of a device with which the pulley apparatus is structurally operatively associated.

Accordingly, having in mind each and every one of the above disadvantages, and others that will be readily apparent to those skilled in the art, it is a primary object of the present invention to provide self-compensating torque transmitting apparatus that is so constituted and arranged as to releasably, substantially permanently, automatically adjust for slippage occurring between the sheave halves thereof and the driving means engageable therewith, such slippage being due to increased loads imposed upon the said apparatus during its operation.

A further primary object of this invention is to provide self-compensating torque transmitting pulley apparatus comprising compensating means that is so constituted and arranged as to unusually efficiently, automatically compensate for lengthening of belt-type driving means, said compensating means being further so constituted and arranged as to be releasably, substantially permanently maintained in any one of a substantially infinite plurality of compensated positions.

Another primary object of the present invention is to provide self-compensating, torque transmitting pulley apparatus comprising compensating means for unusually efficiently, automatically compensating for lengthening of belt-type driving means, said compensating means being so constituted and arranged as to be mutually cooperatively engageable with one of said sheave halves, enabling said one sheave half to be axially movable relative to the other of said sheave halves in one of a plurality of directions only, and to be precluded from axial movement in another of said plurality of directions.

Still another primary object of this invention is to provide self-compensating, torque transmitting pulley apparatus comprising compensating means for unusually efficiently, automatically compensating for lengthening of belt-type driving means, said compensating means being so constituted and arranged as to be continuously mutually cooperatively engageable with one of said sheave halves and including clutch means for releasably, substantially permanently maintaining said compensating means in any one of a substantially infinite plurality of compensated positions.

Yet another primary object of the present invention is the provision of self-compensating, torque transmitting pulley apparatus comprising compensating means for unusually efficiently, automatically compensating for reduction of tension on belt-type driving means, said compensating means being so constituted and arranged as to be mutually cooperatively engageable with one of said sheave halves, enabling said one sheave half to be axially movable relative to the other of said sheave halves in one of a plurality of directions only, and to be precluded from axial movement in another of said plurality of directions, said compensating also serving as a clutch means for releasably, substantially permanently maintaining said one sheave half in any one of a substantially infinite plurality of compensated positions.

Still further, it is a primary object of this invention to provide self-compensating, torque transmitting pulley apparatus wherein the use of any suitable type of compensating means is contemplated for automatically compensating for lengthening of belt-type driving means, the improvement comprising clutch means for releasably, substantially permanently maintaining the compensating means in any one of a substantially infinite plurality of compensated positions, said clutch means being so constituted and arranged as to be continuously mutually cooperatively engageable with one of the sheave halves of the pulley apparatus.

Other objects and important features of the invention will be apparent from a study of the specification following taken with the drawing, which together show, illustrate, describe and disclose a preferred embodiment or modification of the invention and what is now considered to be the best mode of practicing the principles thereof. Other embodiments or modifications may be suggested to those having the benefit of the teachings herein, and such other embodiments or modifications are intended to be reserved especially as they fall within the scope and spirit of the subjoined claims.

In the drawing:

FIGURE 1 is an elevational sectional view of self-compensating, torque transmitting pulley apparatus, constructed in accordance with the principles of the present invention, and illustrating certain component parts in one of a substantially infinite plurality of positions; and FIGURE 2 is a view similar to FIGURE 1 of a modified form of self-compensating, torque transmitting pulley apparatus.

Referring now to the drawing, there is illustrated in FIGURE 1 a self-compensating or automatically compensating, torque transmitting pulley apparatus 10, constructed in accordance with the principles of the present invention, and comprising a plurality of sheave halves 12 and 14.

The sheave half 12 is provided with a generally centrally disposed annular or circular opening or aperture 16. An axially extending annular or generally cylindrical hub portion 18 is disposed within the opening 16 and non-rotatably secured therewithin with respect to the sheave half 12, in any suitable manner, as by press-fitting, staking, or any other conventional operation. The hub portion 18 has a bearing surface 20 extending completely annularly about the external or exterior periphery thereof, with the bearing surface 20 being slideably mutually cooperatively engageable with an annular or generally cylindrical bushing 22. The bushing 22 completely annularly encompasses the hub portion 18 substantially throughout the longitudinal dimensional extent thereof in order to define a substantial bearing surface therebetween, and the bushing 22 preferably is splined at 24 to the hub portion 18 or similarly interconnected thereto in any suitable manner as to be axially slideable thereon and rotatable therewith.

The hub portion 18 comprises at one end thereof a radially outwardly extending, generally annularly configured flange portion 26 at one end thereof that is mutually cooperatively engageable with one end of the sheave half 12 in order to predetermine the position of the sheave half 12 with respect to the hub portion 18. The sheave half 14 is provided with an annular, generally cylindrical portion 28 at the inner end thereof which engages and completely annularly encompasses the bushing 22 substantially throughout the length thereof. The portion 28 of the sheave half 14 is substantially rigidly secured or keyed to the bushing 22 in any suitable or conventional manner as to be axially slideable therewith on the hub portion 18.

In addition to being generally cylindrical, the hub portion 18 is of tubular configuration and is non-rotatably structurally operatively associated with a shaft 30. To this end, the hub portion 18 and the shaft 30 are each provided with splines 32. Of course, any other means for non-rotatably connecting the hub portion 18 to the shaft 30 may be used, such as a key arrangement, press fit, or the like. The shaft 30 provides a power input for the apparatus 10, as by means of a suitable motor of conventional construction (not shown), or may provide a power output from the apparatus 10 to any desired location of use (also not shown).

In order to unusually efficiently, automatically compensate for lengthening of the belt-type driving means 34 disposed between and in contact with the sheave halves 12 and 14, a combined compensating and clutch means 36 is provided for releasably, substantially permanently maintaining the sheave half 14 in any one of a substantially infinite plurality of compensated positions. The compensating and clutch means 36 comprises a stop member 38 having a generally cylindrical portion 40 and a tapered portion 44 extending downwardly towards the sheave half 14. The stop member 38 preferably is rigidly or non-rotatably secured to the hub portion 18 by a threaded bolt or screw 43, or in any other suitable manner. In addition, the shaft 30 may be fixed to the stop member 38, in any suitable manner, to preclude axial relative movement therebetween.

As shown in FIGURE 1, the portion of the sheave half 14 adjacent the stop member 38 is provided with a substantially flat face 42 which is disposed in substantially perpendicular relation to the longitudinal axis of the hub portion 18. The outer substantially flat face 44 of the tapered portion of the stop member 38 extends obliquely with respect to the longitudinal axis of the hub portion 18 and is disposed adjacent to the flat face 42 of the sheave half 14 to define a generally V-shaped cam groove 46 therewith. Slidably disposed or wedged for contraction only in the cam groove 46 is a garter-type spring 48 of any suitable or conventional construction. The rate, weight, length, etc. of the garter spring 48 and the length and angle of inclination of the flat tapered face 44 with respect to the flat sheave face 42 may vary considerably, the only requirement being that the force supplied by the garter spring 48 be sufficient to maintain the sheave half 14 in any one of a substantially infinite plurality of compensated positions against the force exerted by the pulley drive belt 34, as will be more fully described hereinafter.

In the operation thereof, loss or lack of tension in the drive means or belt 34 is induced due to the lengthening thereof during periods of extended usage. This loss of tension produces slack in the drive means 34 which, in turn, results in a reduced resultant force exerted by the drive means against the axially slideable sheave half 14, in the direction of the arrows as seen in FIGURE 1. The compressive force of the greater spring 48 in the cam groove 46, owing to the wedging action of the garter spring 48 therein, results in a force being applied to the axially slideable sheave half 14 which is opposite to the direction of the arrows in FIGURE 1. Therefore, when the force of the drive means on the sheave half 14 is reduced due to reduced tension therein, the opposite force of the garter spring 48 on the sheave half 14 causes it and the bushing 22 on which it is mounted to axially slide on the hub portion 18 towards the other sheave half 12. This movement of the sheave half 14 towards the sheave half 12 increases the effective diameter of the pulley apparatus 10 to increase the tension on the drive means 34 and thus to unusually efficiently eliminate any slack therein. When the proper or predetermined tension in the drive means 34 is attained, the force of the garter spring 48 is such that it will no longer move the sheave half 14 towards the sheave half 12 and the proper tension on the drive means will be maintained. The compressive force of the garter spring 48 and the size or angle of the cam groove 46 are so predetermined that the garter spring 48 will not radially expand or back out of the cam groove 46 under the force of the drive means 34. The garter spring 48, therefore, acts to maintain the sheave half 14 in a compensated position unless there is a further reduction in tension in the drive means 34, at which time the garter spring will radially contract in the cam groove 48 to move the sheave half 14 towards the sheave half 12 and into another compensated position to again restore the proper or predetermined tension in the drive means 34.

A modified form of the pulley apparatus 10 of FIGURE 1 is shown in FIGURE 2. The modified pulley apparatus 100 of FIGURE 2 is very similar in construction to the pulley apparatus 10 in that it comprises a sheave half 112 that is fixedly secured to a hub portion 118 which in turn is splined to a shaft 130 and a second sheave half 114 that is fixedly secured to a bushing 122 which in turn is axially slideably mounted on the hub portion 118. A stop member 138 is disposed adjacent the sheave half 114 and is secured by a threaded bolt 143 to the hub portion 118. The stop member 138 is provided with a substantially flat face 144 adjacent the sheave half 14, and the sheave half 14 is provided with a substantially flat, tapered face 142 adjacent the flat face 144. The stop member flat face 144 is disposed in substantially perpendicular relation to the longitudinal axis of the hub portion 118, and the flat sheave face 142 extends obliquely with respect to the longitudinal axis of the hub portion 118 to define a generally V-shaped cam groove 146 with the stop member flat face 144. A garter spring 148 is disposed in the cam groove 146 in tight wedging engagement with the faces 142 and 144 for compressive movement therebetween. The garter spring 148 functions to maintain the proper tension on the drive means 134 between the sheave halves 112 and 114 in the same manner as the aforedescribed garter spring 48 of FIGURE 1, and thus there is no necessity herein for the depetition of the description of the operation of the garter spring 48 with respect to the garter spring 148 which is substantially identical thereto in construction and operation.

It will be understood that the combined compensating and clutching means 36 and 136 of FIGURES 1 and 2, respectively, could be utilized only as a clutching means in combination with a separate compensating means of any suitable or conventional construction to maintain the sheave halves of a pulley apparatus in a compensated position after their relative movement thereto by the separate compensating means.

While the invention has been shown, illustrated, described and disclosed in terms of one or more embodiments or modifications which has been assumed in practice, the scope of the invention should not be deemed to be limited by the precise embodiments or modifications herein shown, illustrated, described or disclosed, such other embodiments or modifications intended to be reserved especially as they fall within the scope of the claims here appended.

What is claimed is:

1. A pulley apparatus for automatically maintaining a constant tension on a cooperating drive means, comprising:

a generally cylindrical hub portion, a first sheave half secured to said hub portion and extending generally radially outwardly therefrom, a second sheave half axially slideably mounted on said hub portion and axially spaced from said first sheave half, said sheave halves being adapted to receive said drive means therebetween and defining the effective diameter of said pulley apparatus in accordance with the axial spacing therebetween, compensating means for releasably maintaining said sheave halves in any one of a plurality of relative compensating positions to maintain a constant tension on said drive means, said compensating means comprising in turn:

an annular stop member rigidly secured to said hub portion and having a substantially flat face disposed adjacent to said second sheave half, said second sheave half having a substantially flat face disposed adjacent said stop member face to define a cam groove therebetween, and an annular garter-type spring disposed in said cam groove and in tight compressive engagement with said stop member face and said second sheave half face, said garter-type spring being adapted to exert a sufficient force against said second sheave half to maintain the sheave halves in any one of a plurality of relative compensating positions against the force of said drive means to maintain a constant tension on the latter said cam-groove having an angle of inclination so that said garter-type spring is only radially inwardly movable in said cam groove.

2. The pulley apparatus as recited in claim 1 wherein: said stop member face extends obliquely with respect to the longitudinal axis of said hub portion, and said second sheave half face is disposed in substantially perpendicular relation to the longitudinal axis of said hub portion to define a generally V-shaped cam groove between said stop member face and said second sheave half face.

3. The pulley apparatus as recited in claim 1 wherein: said stop member face is disposed in substantially perpendicular relation to the longitudinal axis of said hub portion, and said second sheave half face extends obliquely with respect to the longitudinal axis of said hub portion to define an annular, generally V-shaped cam groove between said stop member face and said second sheave half face.

4. In a pulley apparatus comprising a hub portion, a first sheave half secured to the hub portion, a second sheave half axially slideably mounted on the hub portion and axially spaced from the first sheave half, the sheave halves adapted to receive a drive means therebetween and defining the effective diameter of the pulley apparatus in accordance with the axial spacing thereof, the improvement comprising:

compensating means for releasably maintaining said sheave halves in any one of a plurality of relative compensating positions to maintain a constant tension on said drive means; said compensating means comprising in turn:

an annular stop member rigidly secured to the hub portion and having a substantially flat face disposed adjacent to the second sheave half to define a generally V-shaped cam groove therebetween, and an annular garter-type spring disposed in said cam groove and in tight compressive engagement with the second sheave half and said stop member face, said garter-type spring being adapted to exert a sufficient force against the second sheave half to move the second sheave half to any one of a plurality of compensating positions relative to the first sheave half and to maintain the second sheave half in any one of said positions against the force of the drive means to maintain a constant tension on the latter said garter-type spring being only radially inwardly movable in said annular cam groove to thus maintain the second sheave half in any one of said plurality of compensating positions thereof relative to the first sheave half.

5. The compensating means as recited in claim 4 wherein said stop member face is tapered and extends obliquely with respect to the longitudinal axis of the hub portion.

6. The compensating means as recited in claim 4 wherein said stop member face is disposed in substantially perpendicular relation to the longitudinal axis of the hub portion.

References Cited by the Examiner
UNITED STATES PATENTS

| | | | |
|---|---|---|---|
| 2,916,926 | 12/1959 | Albertson et al. | 74—230.17 |
| 3,114,271 | 12/1963 | Davis | 74—230.17 |

DAVID J. WILLIAMOWSKY, *Primary Examiner.*

L. H. GERIN, *Assistant Examiner.*